US012789401B2

(12) United States Patent
Laschinski et al.

(10) Patent No.: US 12,789,401 B2
(45) Date of Patent: Nov. 10, 2026

(54) PERSONAL CARE DEVICE SUCH AS ELECTRIC HAIR TRIMMER WITH ILLUMINATION UNIT

(71) Applicant: Braun GmbH, Kronberg (DE)

(72) Inventors: Gerd Laschinski, Bad Homburg (DE); Markus Schuessler, Koenigstein (DE); Philipp Goeder, Frankfurt (DE); Ruediger Boss, Frankfurt (DE); Sebastian Heinrich, Bartholomae (AT)

(73) Assignee: Braun GMBH, Kronberg (DE)

( * ) Notice: Subject to any disclaimer, the term of this patent is extended or adjusted under 35 U.S.C. 154(b) by 77 days.

(21) Appl. No.: 18/757,016

(22) Filed: Jun. 27, 2024

(65) Prior Publication Data

US 2025/0001634 A1 Jan. 2, 2025

(30) Foreign Application Priority Data

Jun. 30, 2023 (EP) .................................... 23182816

(51) Int. Cl.
*B26B 19/46* (2006.01)

(52) U.S. Cl.
CPC .................................... *B26B 19/46* (2013.01)

(58) Field of Classification Search
CPC .............................. B26B 19/46; A46B 15/006
USPC .................................................. 362/119, 120
See application file for complete search history.

(56) References Cited

U.S. PATENT DOCUMENTS 2,635,179 A * 4/1953 Bowman ................. B26B 19/46 30/34.05
3,770,950 A * 11/1973 Brenneman ............. B26B 19/28 362/115
2022/0273408 A1 9/2022 Lawrence et al.

FOREIGN PATENT DOCUMENTS

EP 2851167 A1 * 3/2015 ............. B26B 19/46
EP 3546155 A1 10/2019
EP 4147834 A1 3/2023
WO 2021032578 A1 2/2021

OTHER PUBLICATIONS

EPO Search Report and Opinion for 23182816.1 dated Nov. 17, 2023; 5 pages.
EPO Search Report and Opinion for 24185010.6 dated Nov. 20, 2024; 7 pages.

* cited by examiner

*Primary Examiner* — Jennifer S Matthews
(74) *Attorney, Agent, or Firm* — Gerd Zetterer

(57) ABSTRACT

The present invention relates to a personal care device, comprising an elongated housing receiving an electric motor and/or an electric power source, a working head attached to said housing, wherein and an illumination unit for illuminating the working head and/or a surrounding working area, wherein the illumination unit comprises a light guide for guiding light from a light source to a light emitting member, wherein said housing includes an inner housing and an outer housing surrounding said inner housing, the inner housing forms a sealed container in which said motor and said light source are received, wherein said light guide extends through said inner housing and through said outer housing.

16 Claims, 13 Drawing Sheets

PERSONAL CARE DEVICE SUCH AS ELECTRIC HAIR TRIMMER WITH ILLUMINATION UNIT

FIELD OF THE INVENTION

The present invention relates to a personal care device, in particular an electric hair trimmer, comprising an elongated housing receiving an electric motor and/or an electric power source, a working head attached to said housing, and an illumination unit for illuminating the working head and/or a surrounding area, wherein said illumination unit includes a light guide for guiding light from a light source to a light emitting member.

BACKGROUND OF THE INVENTION

Electric hair trimmer and other hair removal devices such as shavers or epilators usually have one or more cutter elements driven by an electric drive unit in an oscillating or continuous manner to rotate or reciprocate wherein the cutter elements may cooperate with a comb-like cutter bar or other co-operative counter elements such as a shear foil. The electric drive unit may include an electric motor or a magnetic-type linear motor, wherein the drive unit may include a drive train having elements such as an elongated drive transmitter for transmitting the driving motion of the motor to the cutter element, wherein said motor, a power source such as a battery and electronics may be received within the handle portion of the handheld personal care device.

So as to illuminate the working zone, in particular the cutting tools and/or ambient areas such as the hairs to be cut or the skin to be shaved or the teeth to be cleaned, the hand held personal care devices may be provided with an illumination unit including a light source such as an LED and some sort of optics to get the light directed onto the areas to be illuminated. More particularly, such optics may include a light guide for guiding the light from the light source to a light emitting member to allow the light source being spaced apart from the light emitting surface and in particular being positioned inside the housing even when the light emitting surface is on the outside of the housing. Accommodation of the light source inside the housing does not only protect the light source against moisture, dirt, and other environmental damages, but helps in making power supply and linkage to the controller easy.

The housing accommodating the electric motor, the electric power source, electronics and also the light source of the illumination unit often includes an elongated base element closed by a cover element to allow for mounting and accommodating the electronic components inside the housing. As the housing should nevertheless form a sealed container for protecting the electric components from liquids and moisture, a seal is provided between the base element and the cover element, wherein such seal may include a sealing ring extending between surfaces of the base element and the cover element facing each other.

Generally, mounting of such sealing elements is prone to faults and mistakes. Additionally, when accommodating the light source inside the housing, additional sealing problems may arise as the light from the light source needs to get through the housing. For example, WO 2021/032578 A1 suggests a transparent wall portion of the housing forming a sort of window through which the light source may emit light, wherein a light guide is arranged outside and adjacent to said optically transparent wall portion to receive the emitted light and to guide it to the light emitting member. However, such transparent wall portion considerably increases manufacturing complexity and furthermore, light transmission efficiency may be afflicted with such transparent wall portion which may get muddy or hazy over time and may negatively affect light coupling into the light guide.

Another issue of such prior art light guides at personal care devices is quality of illumination of the relevant areas. On the one hand, a rather high brightness is desired to achieve good visibility. Spotting focused light onto the working tools may provide for sufficient brightness but does not illuminate the surrounding areas sufficiently and also may give rise to glare.

SUMMARY OF THE INVENTION

It is an objective underlying the present invention to provide for an improved personal care device such as an electric hair trimmer avoiding at least one of the disadvantages of the prior art and/or further developing the existing solutions.

A more particular objective underlying the invention is to provide for an improved illumination of the working head and its working tools and the surrounding areas, providing for sufficient brightness without glaring and dazzling a user.

A further objective underlying the invention is to provide for an improved personal care device having a sealed container housing for accommodating electric components including the light source without negatively affecting the light transmission efficiency and illumination of relevant working areas.

More particularly, an objective underlying the present invention is to achieve good illumination of the working tools of the working head and/or surrounding working areas with sufficient brightness without dazzling the user with a protected light source arrangement in the interior of the housing.

To achieve at least one of the aforementioned objectives, it is suggested to have the light guide extending through the housing to extend from the interior of the housing where the light source is accommodated to the exterior side of the housing to illuminate the working head and/or a surrounding working area externally. More particularly, the housing may have a two-shell or multiple-shell structure including an inner housing and an outer housing surrounding said inner housing, wherein the inner housing forms a sealed container in which at least the motor and the light source are received, wherein the light guide extends through the inner housing and through the outer housing and is sealed against such inner housing by having said light guide and said inner housing forming an integral plastic molding piece. Due to the light guide extending though the inner housing and being sealed against it, lighting efficiency is not sacrificed for protected accommodation of the light source. Direct and efficient coupling of light from the light source into the light guide may be achieved, separate transparent window portions in the housing are not necessary, and separation from the inlet portion of the light guide from the light source can be avoided.

According to another aspect, the light guide may have an enlarged outlet end portion that is significantly larger than the inlet end portion and provides for a large light emitting surface extending along a significant portion of the working head and/or housing to achieve illumination of the working head and/or the surrounding working area with high brightness, but substantially no dazzling of a user. Such large emitting surface allows for reduced light intensity without sacrificing luminance.

More particularly, the light guide may have a cross-sectional area continuously increasing from the inlet end portion to the outlet end portion of the light guide, wherein the cross-sectional area at the outlet end portion is more than 150% or more than 200% or more than 300% of the cross-sectional area at the inlet end portion. The outlet end portion may define an elongated light emitting surface which, in comparison to the working head, may have a length ranging from 33% to 120% or 50% to 100% or 50% to 75% of a maximum length or maximum extension of the working head or of a working tool unit of the working head. For example, the working head may include an elongated cutter bar, wherein, in comparison to such elongated cutter bar, the elongated light-emitting surface may have a length of more than 50% or more than 66% or more than 75% of such cutter bar. For example, a ratio of the cutter bar length to the light-emitting surface length may range from 2 to 1 or from 2 to 1.5. “Length” means the maximum extension of such elongated elements along their longest axis. Said cutter bar being provided with rows of cutting teeth.

According to a still further aspect, the light-emitting surface of the light guide may be positioned on an outer side of the housing having intervisibility to the working unit of the working head so there are no shadows impairing the illumination of the relevant target areas including the working tool unit and its working area, but the working unit can be fully illuminated.

Such light-emitting surface may be substantially flush with an outer surface portion of the housing which outer surface portion may have a three-dimensional curvature. So as to nevertheless have the light emitted from the light emitting surface concentrated onto the working unit and/or the surrounding working area, the light-emitting surface may have a cascaded or stepped contour, the outer portions of which are substantially flat with the neighboring housing walls. The stepped front surfaces of such cascaded contour may direct the light directly onto the target zone.

These and other advantages become more apparent from the following description giving reference to the drawings and possible examples.

DETAILED DESCRIPTION OF THE INVENTION

Figure 1:
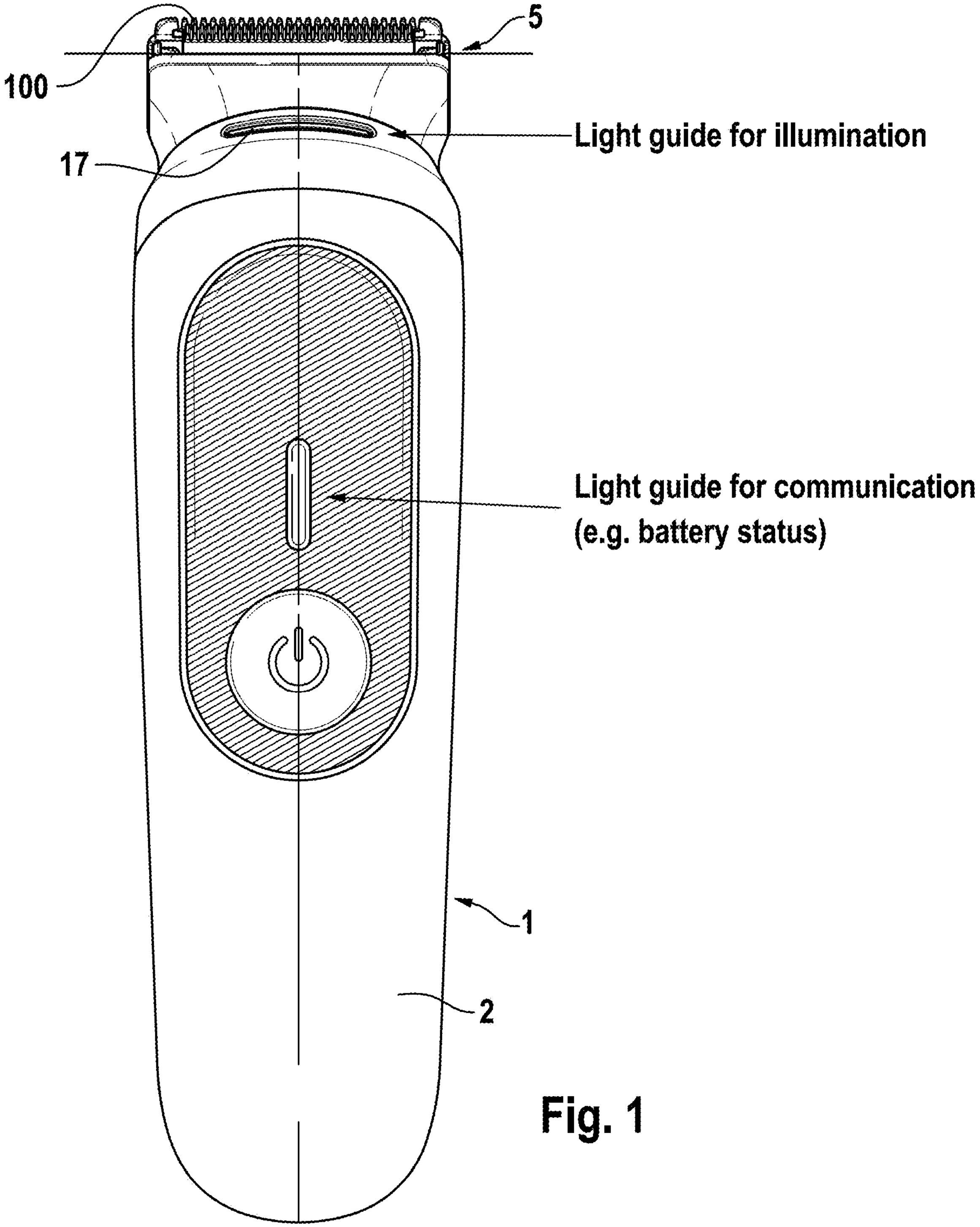
FIG. 1: a front view of an electric hair trimmer with an illumination device.

According to an aspect, to achieve at least one of the aforementioned objectives, it is suggested to provide for having the light guide extending through the housing to extend from the interior of the housing where the light source is accommodated to the exterior side of the housing to illuminate the working head and/or a surrounding working area externally. More particularly, the housing may have a two-shell or multiple-shell structure including an inner housing and an outer housing surrounding said inner housing, wherein the inner housing forms a sealed container in which at least the motor and the light house are received, wherein the light guide extends through the inner housing and through the outer housing and is sealed against such inner housing.

Due to the light guide extending though the inner housing and being sealed against it, lighting efficiency is not sacrificed for protected accommodation of the light source. Direct and efficient coupling of light from the light source into the light guide may be achieved, transparent windows in the housing and opacity thereof can be avoided, and furthermore, the inlet portion of the light guide does not need to be spaced apart from rom the light source.

According to another aspect, the light guide may have an enlarged outlet end portion that is significantly larger than the inlet end portion and provides for a large light emitting surface extending along a significant portion of the outer surface of the handle or neck of the personal care device to achieve illumination of the working head and/or the surrounding working area with high brightness, but substantially no dazzling of a user.

More particularly, the light guide may have a cross-sectional area continuously increasing from the inlet end portion to the outlet end portion of the light guide, wherein the cross-sectional area at the outlet end portion is more than 150% or more than 200% or more than 300% of the cross-sectional area at the inlet end portion.

The outlet end portion may define an elongated light emitting surface which, in comparison to the working head, may have a length ranging from 33% to 120% or 50% to 100% or 50% to 75% of a maximum length or maximum extension of the working head or of a working tool unit of the working head. For example, the working head may include an elongated cutter bar, wherein, in comparison to such elongated cutter bar, the elongated light-emitting surface may have a length of more than 50% or more than 66% or more than 75% of such cutter bar.

For example, a ration of the cutter bar length to the light-emitting surface length may range from 2 to 1 or from 2 to 1.5.

According to a still further aspect, the light-emitting surface of the light guide may be positioned on an outer side of the housing having intervisibility to the working unit of the working head to avoid shadows impairing illumination of the working zone of the personal care device so at least the working unit can be fully illuminated.

Such light-emitting surface may be substantially flush with an outer surface portion of the housing which outer surface portion may have a three-dimensional curvature. So as to nevertheless have the light emitted from the light emitting surface concentrated onto the working unit and/or the surrounding working area, the light-emitting surface may have a cascaded or stepped contour, the outer portions of which are substantially flush with the neighboring housing walls. The stepped front surfaces of such cascaded contour may direct the light directly onto the target zone.

So as to achieve efficient transmission, the light guide may be configured to have total internal reflection and may extend, from the inner housing to the outer housing, spaced apart from other elements of the personal care device and may be surrounded by an air gap. Substantially all light coupled into the light guide is transmitted to the light emitting surface and thus, to the target zone.

Considering the light guide in its entirety, it has a main longitudinal axis extending from the inlet end portion to the outlet end portion, wherein such main longitudinal axis may have an S-shape or meandering shape or sinuous-winding shape. Due to such bowing to opposite sides, light is mixed to become more homogeneous before emitted from the emitting surface. More particularly, such curvature of the longitudinal axis may be provided in a plane transverse to the larger surfaces of the light guide or transverse to the longitudinal axis of the light emitting surface. In other words, the light guide may have a substantial plate shape with buckles or slight corrugations.

So as to achieve shadow-free and bright illumination of for example bearded skin, the light emitting member may be configured to provide for diffused lighting. For example, the light emitting surface may be provided with a surface structure such as a matt finish for scattered emission of the light.

As mentioned, the inner housing may form a sealed, in particular water-proof container in which the motor, batteries or accumulators or other power sources and an electronic control unit for controlling the motor, and furthermore, the light source of the illumination unit may be received and protected against liquids and moisture. So as to achieve a structure allowing for easy mounting and good sealing, said container may have a barrel structure and being formed by an elongated pot or cup having a closed bottom and an open top side, wherein the motor, an electronic control unit and batteries may be completely received within such cup element of the inner housing which, at its open top side, may be closed by means of a cover element which may form the front face of the barrel-like container forming the inner housing.

Thus, the barrel-like container forming the inner housing may have a two-piece structure comprising only two pieces, i.e. the aforementioned cup element and the cover element. Such two-piece structure of the inner housing considerably reduces sealing efforts necessary to make the container waterproof. In particular, it may be sufficient to use only one ring-shaped seal to seal the interface between the cup element and the cover element, wherein such interface may have a circular configuration although other contours such as oval or elliptical contours would be possible. The seal may be formed from silicone. The cover element and/or the base element of the housing may be formed from polybutylene terephthalate (PBT), wherein, however, other plastic materials or non-plastic materials may be used.

The aforementioned cup-shaped base element may have an elongated configuration extending substantially over the entire length of the inner housing and may have a length corresponding to at least 80% or 90% of the inner housing and/or of the handle, whereas the cover element may have a length of smaller than 20% or smaller than 10% of the inner housing's length and/or the handle's length. Such cover element may have a disk-like or plate like configuration, wherein it my have a slightly dome-shaped or convex contour.

The cover element and the cup element of the inner housing may be rigidly connected to each other, wherein various known types of connection techniques such as form-fitting, screwing, welding, gluing and/or snap-fitting may be used.

So as to help in sealing the inner housing, the inner housing may have only one opening which may be an opening in the cover element through which the shaft protrudes. Optionally, there may be a second opening in an end portion opposite to the cover element which second opening may be provided for a charging connection. However, such second opening may be avoided by means of integrating the charging connectors into the inner housing, for example by means of molding charging pins to be an integral part of the inner housing.

The outer housing may have a two-piece or three-piece or multiple-piece shell structure comprising a plurality of shell elements that can be connected with each other and cover different portions of the inner housing. In particular, the outer housing may comprise two shell elements extending on opposite sides of the inner housing and connectable to each other. Such shell elements may have a substantially—roughly speaking—flute-like or chute-like contour so that the two shell elements together may surround the inner housing substantially completely.

In addition to such shell elements, the outer housing may further include a ring element to be connected with at least one of the aforementioned shell elements. Such ring element may help in forming a rigid, strong outer housing structure, wherein such ring element may be positioned at an end portion of the housing facing the shaver head. More particularly, such ring element may surround the shaft.

These and other features become more apparent from the examples shown in the drawings.

As can be seen from FIG. 1, hair trimmer 1 may have a trimmer housing 3 forming a handle 2 for holding the hair trimmer, which handle may have different shapes such as—roughly speaking—a substantially cylindrical shape or box shape or bone shape allowing for ergonomically grabbing or holding the hair trimmer, wherein such hair trimmer handle 2 has a longitudinal axis 20 due to the elongated shape of the handle, cf. FIG. 1.

More particularly, the handle 2 may have a cross-sectional shape which is rounded or circular or oval or elliptical, wherein mixtures of those shapes are possible.

On one end of the handle 2, a working head 5 is attached to the handle 2. The working head 5 may include an elongated cutter unit 100 comprising an elongated comb-like cutter elements 4 that can be driven in a reciprocating manner. More particularly, said elongated cutter unit 100 may form a long hair cutter or a trimming tool for trimming hair or beards.

An elongated drive transmitter 9 may extend from the handle 2 into the working head 5 so as to connect the cutter elements 4 to a motor 93 which may be accommodated in the interior of the handle 2.

Figure 8:
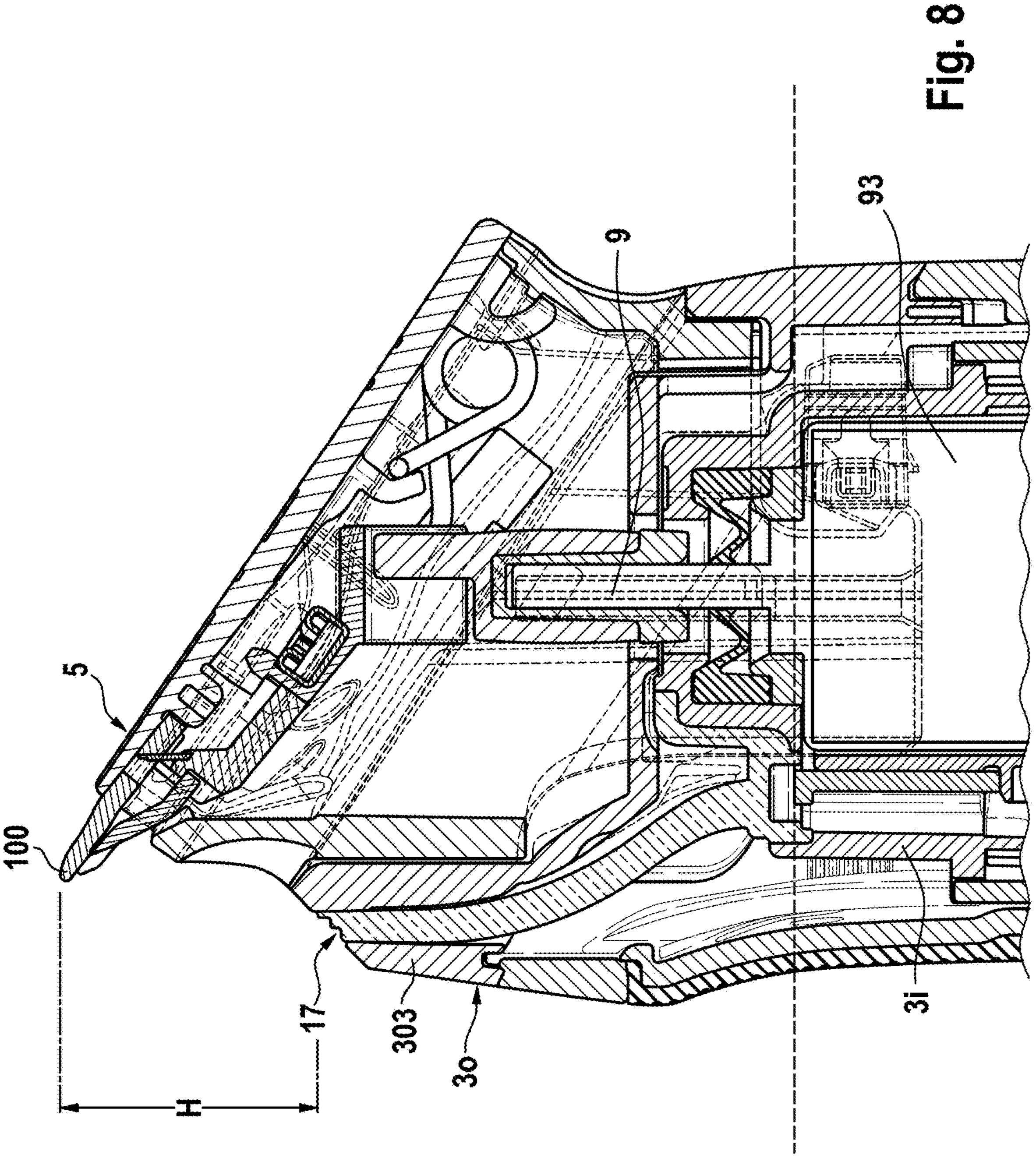
FIG. 8: a cross-sectional view of the working head and the neighboring portions of the housing of the hair trimmer, including the illumination unit integrated into the housing with the light guide going through the interior housing.

As can be seen from FIG. 8, the housing 3 forming the handle 2 may have a two-shell structure comprising an inner housing 3*i* and an outer housing 3*o* surrounding said inner housing 3*i*.

Figure 13:
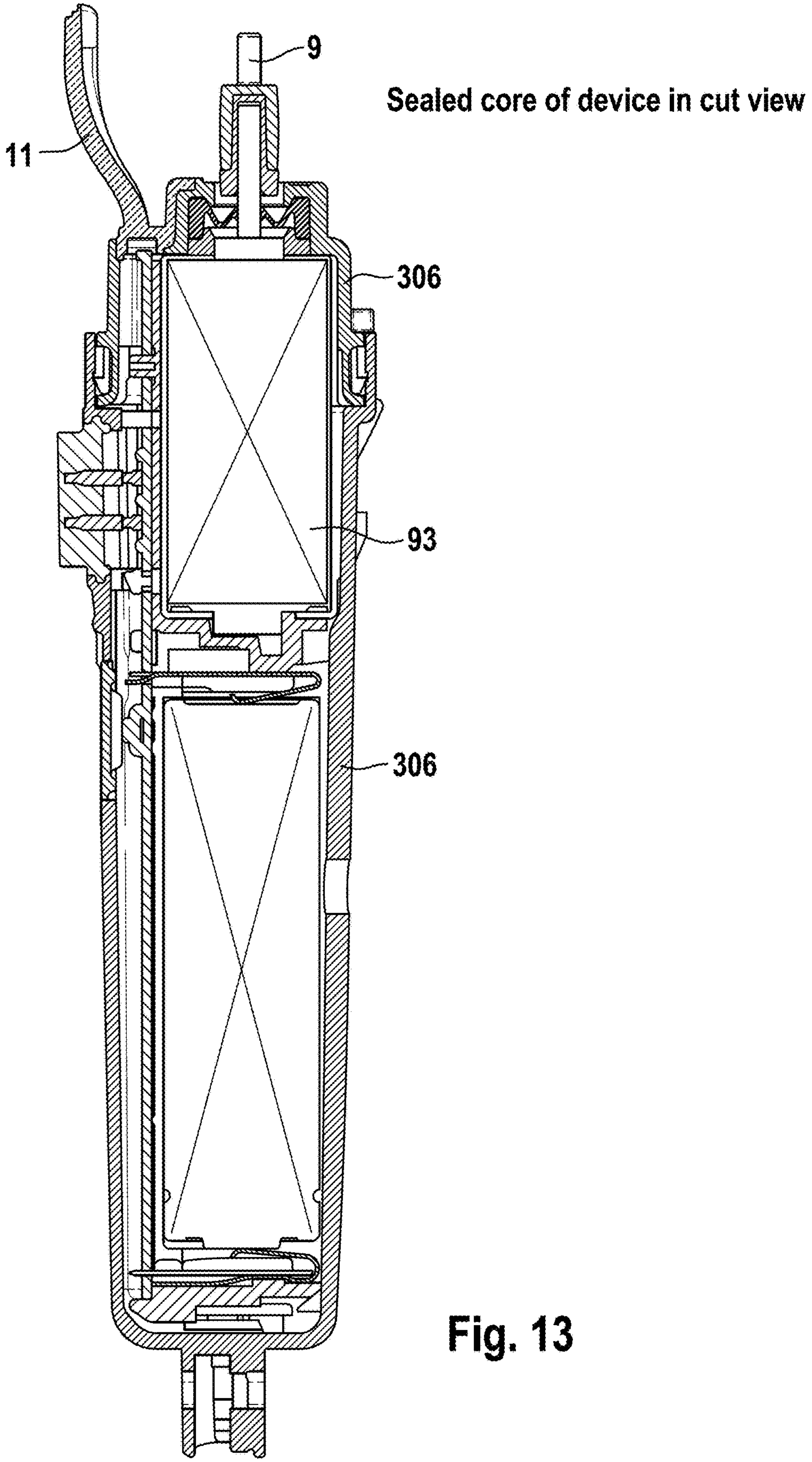
FIG. 13: a longitudinal cross-sectional view of the inner housing including the light guide and the components accommodated in the interior of the inner housing.

The inner housing 3*i* accommodates the aforementioned motor 93 and furthermore, an electrical storage such as batteries or an accumulator, and an electronic control unit, cf. FIG. 13, wherein the inner housing 3*i* may form a water-tight container protecting such components from liquids and moisture.

More particularly, as shown by FIG. 13, the inner housing 3*i* may have an elongated barrel-like structure including a cup-shaped or pot-like base element 306 having a closed bottom and an open top face, wherein such base element may extend substantially over the entire length of the handle 2.

The base element 306 is closed, at its open top side, by a cover element 307 which may have a plate-like or slightly dome-like shape and, when closing the base element 306, forms a front face side of the inner housing 3*i* facing the working head 5.

The aforementioned cover element 307 includes an opening through which the motor shaft or transmitter 9 penetrates the housing, wherein the cover element 307 is sealed, by means of appropriate seals 400, against said shaft or transmitter and against the base element 306 so that the inner housing 3*i* forms a waterproof container.

The outer housing 3*o* may have a shell structure including a pair of elongated shell elements and which together may surround the inner housing 3*i* substantially entirely. The shell elements may extend substantially over the entire length of the inner housing 3*i* and/or the handle 2.

Said shell elements 304 and 305 may be positioned on opposite sides of the inner housing 3*i* and may be connected to each other so that they together form the gripping surface of the substantially cone-shaped or cylindrical handle 2.

In addition, the outer housing 3*o* may include a ring element 303 forming, at least in part, a top side surface of the outer housing 3*o* facing the working head 3. Said ring element 303 is connected to at least one of the shell elements 304 and 305.

Figure 7:
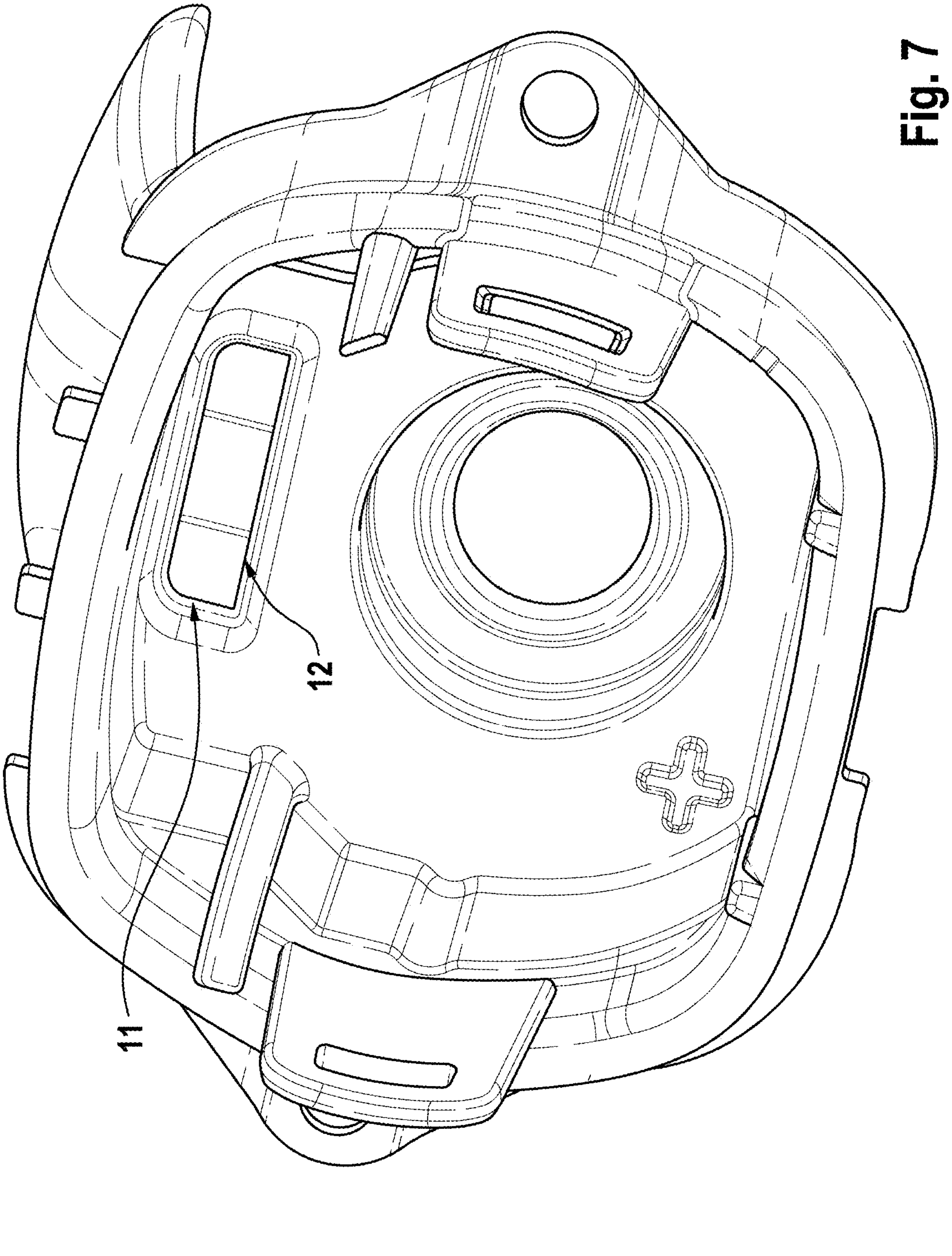
FIG. 7: a perspective bottom view of the interior housing cover element showing the inlet side of the light guide to be connected to the light source at the bottom portion of said cover element.

FIG. 7 shows a perspective bottom view of the interior housing cover element showing the inlet side of the light guide to be connected to the light source at the bottom portion of said cover element. As shown therefrom the lightguide and the cover part of the inner housing are made as integral part.

As can be seen from FIGS. 8 and 13, the inner housing 3*i* also accommodates the light source 12 of an illumination unit 10 for illuminating the working head 5 and a surrounding working area, in particular the elongated cutter unit 100 and the neighboring ambient area where hairs to be cut or skin to be shaved may be expected.

So as to get light from the light source 12 to the outer periphery of the working head 5, the illumination unit 10 includes a light guide 11 extending from said light source 12 to an outer surface of the outer housing 3*o*.

Such light guide 11 may be a form material body made from plastic and may have a configuration to achieve total internal reflection so substantially no light exits the light guide 11 at its circumferential side or at its medium portion between the inlet end portion 14 and the outlet end portion 16.

So as to combine high lighting efficiency with protected accommodation of the light source 12, said light guide 11 extends through the outer housing 3*o* and through the inner housing 3*i*, wherein the light guide 11 is sealed against said inner housing 3*i*. As can be seen from FIG. 6, the inlet end portion 14 of the light guide 11 may form an integral part of or a portion of the inner housing 3*i*. More particularly, the inlet end portion 14 may form a part of the cover element 307 of inner housing 3*i* and, thus, may form a part of the bottom portion of said cover element 307, cf. FIG. 6.

The light guide 11 may be sealed to the inner housing 3*i* by means of welding such as laser welding, gluing or by means of sealing elements or sealing layers.

According to an aspect, the light guide 11 and the inner housing 3*i* may form an integral one-piece structure. More particularly, the light guide 11 and the inner housing 3*i* may be a two-component molding part that may be formed by a two-step or multiple step injection molding process from plastic. The light guide 11 may be formed from transparent plastic, whereas the inner housing 3*i* may be formed from non-transparent plastic. For example, the cover element 307 of inner housing 3*i* may be injection-molded in a first step to have a through hole for the light guide 11. In a second injection molding step, the light guide 11 may be molded to fill out such through hole in the cover element 307.

Due to such two-step injection molding process, the light guide is reliably sealed against the inner housing 3*i*.

Due to the fact that the light guide 11 extends through the inner housing, the light source 12, which may be an LED or an LED cluster, may be positioned directly adjacent to the inlet side of the light guide 11.

Figure 10:
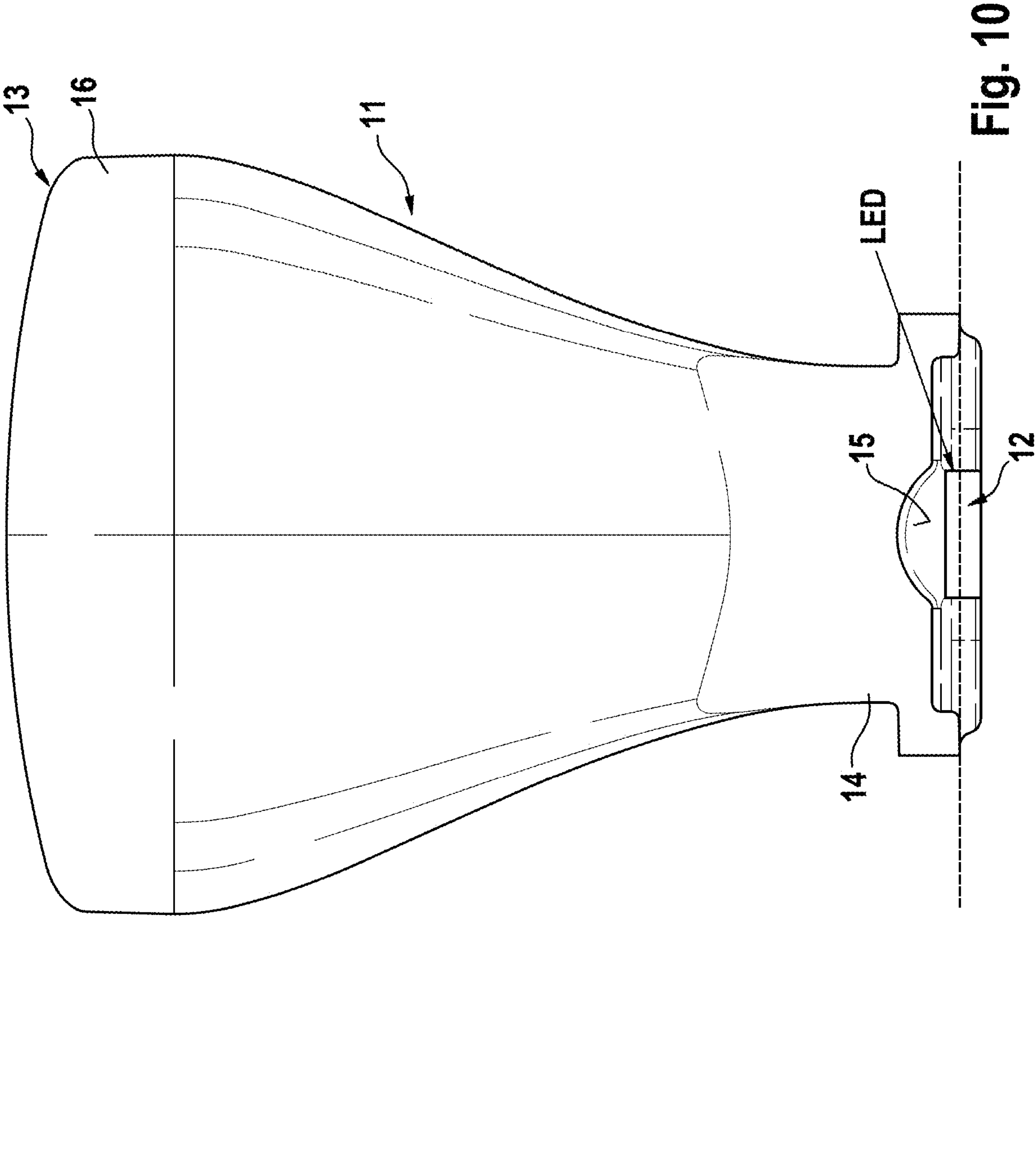
FIG. 10: a backside view of the light guide of FIG. 9 showing the arrangement of the light source in a concavity of the inlet portion of the light guide.

As can be seen from FIG. 10 and also from FIG. 8, the inlet end portion 14 of the light guide 11 may be provided with a concavity or a recess in its front end side to face the light source 12 which may be accommodated at least partly in the interior of such recess. More particularly, the light receiving surface 15 at which light from the light source 12 is coupled into the light guide 11, may be provided with such recess, cf. FIG. 6.

Such cavity or recess allows the light guide 11 to surround the light source 12 on a peripheral side so the light guide 11 may catch substantially the entire light emitted from the light source 12. Although LEDs are usually half space emitters, i.e., emit light into a hemisphere, substantially the entire light is getting into the light guide, thereby achieving high efficiency.

Figure 3:
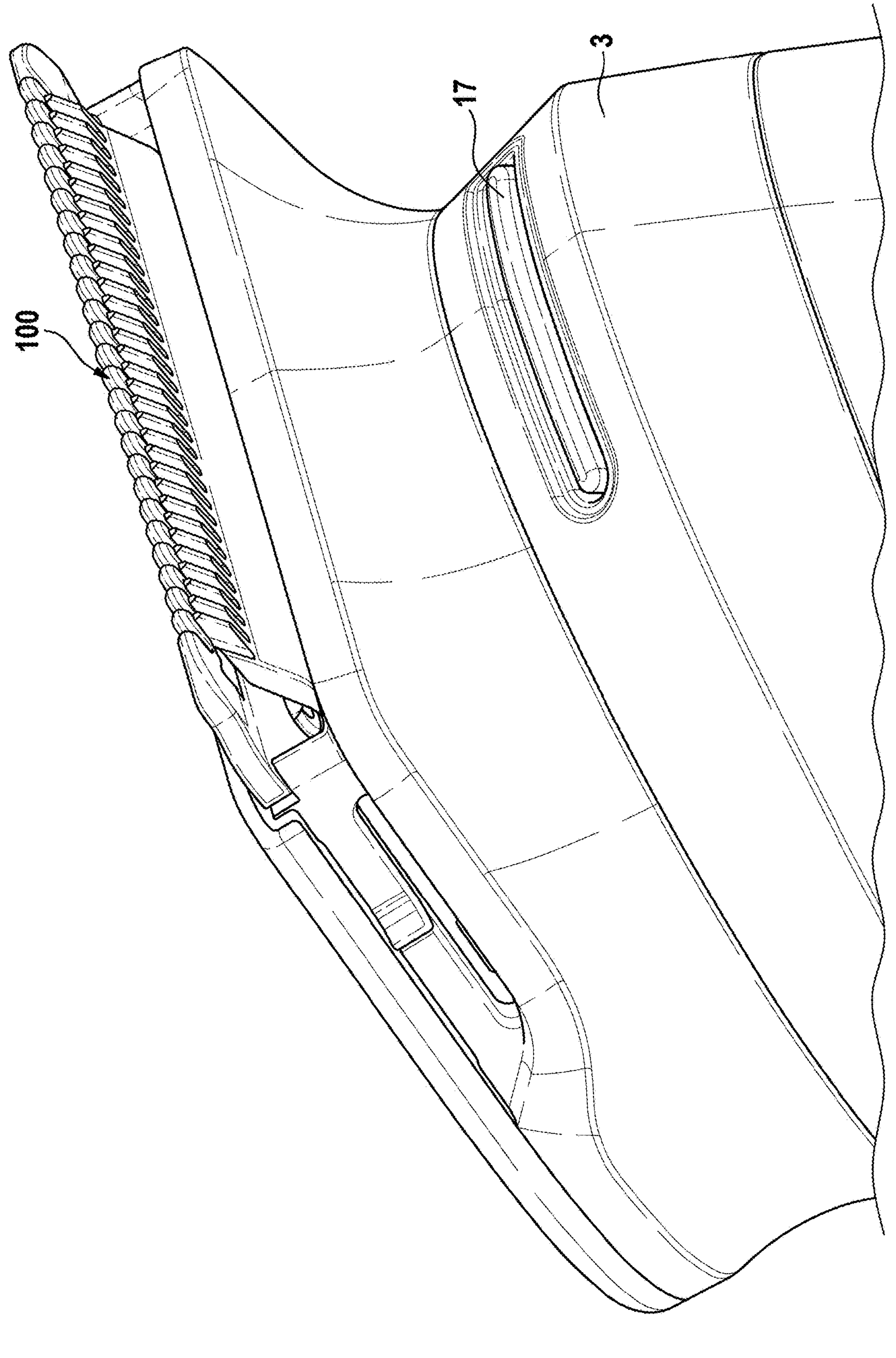
FIG. 3: a partial perspective view of the working head of the hair trimmer and the light emitting surface of the illumination unit in proximity to the working tools.

As can be seen from FIG. 8 and FIG. 3, the light-emitting surface 17 of the light guide 11 may be positioned close to the working head 5 and, more particularly, very close to the elongated cutter unit 100. When considering FIG. 8 and the drive chain illustrated therein, the light guide 11 may extend, in the longitudinal direction 20 of the handle 2, beyond the transmitter 9 which is transmitting the driving action of the motor 93 into the working head 5. More particularly, the light-emitting surface 17 may be further spaced from the light source 12 than from the elongated cutter unit 100. For example, the light emitting surface 17 may be spaced apart from the working tool units by a distance that is smaller than a length of the elongated light emitting surface 18, cf. FIG. 1 and FIG. 4 and FIG. 14.

Figure 9:
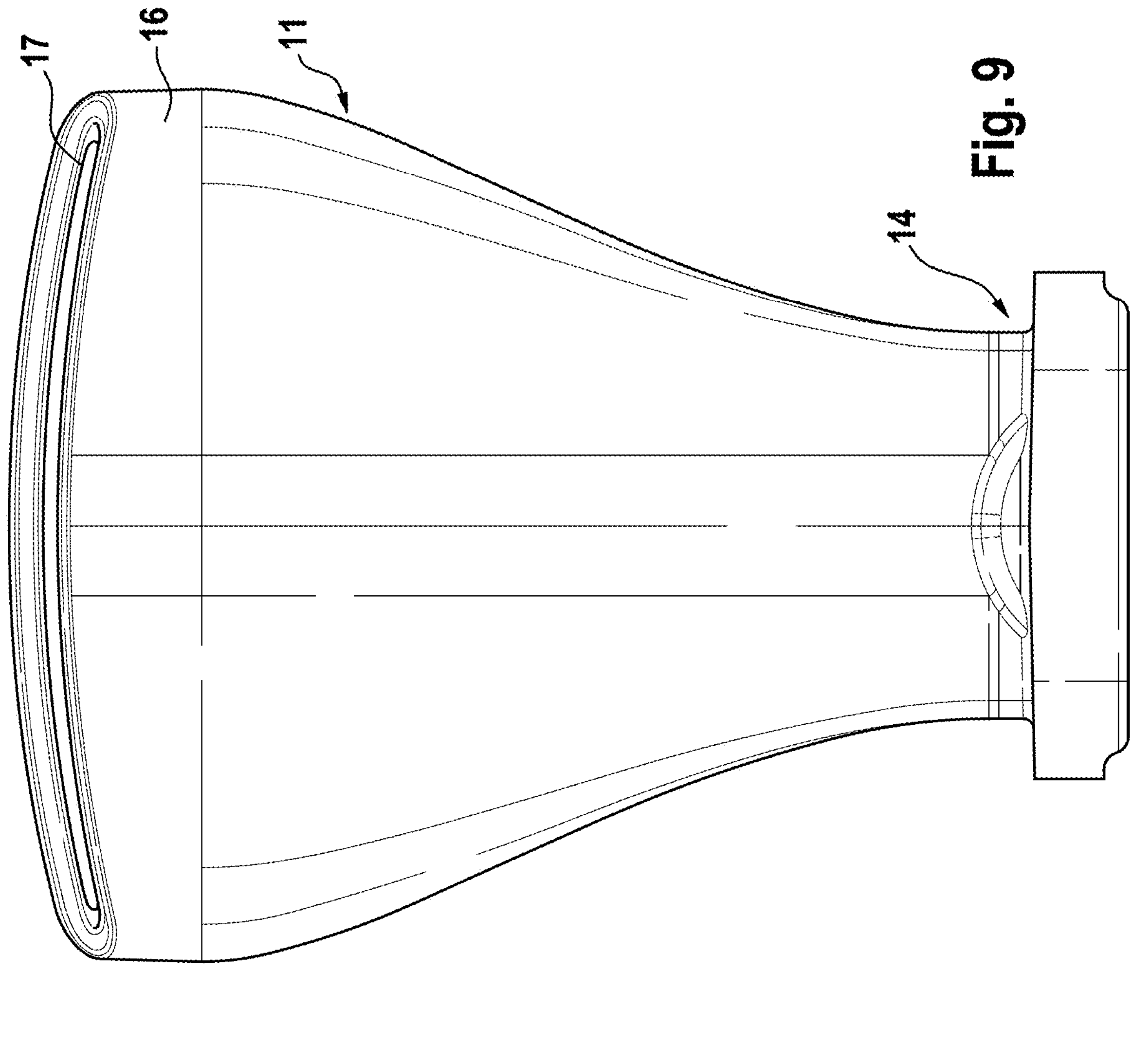
FIG. 9: a front side view of the light guide showing the light emitting surface, the inlet portion and the intermediate portion connecting the inlet portion to the emitting surface.

As can be seen from FIG. 9 and FIG. 10, the cross-section of the light guide 11 continuously increases from the inlet end portion 14 to the outlet end portion 16. Considering the entire light guide 11, it may have a substantially tongue-like shape, wherein it gets wider or longer towards the light-emitting surface 17. For example, the cross-sectional area at the outlet end portion 16 may be more than 200% or more than 300% of the cross-sectional area at the inlet end portion. As can be seen from FIGS. 5 and 6, the light guide 11 extends along a main axis or a longitudinal axis 21 which is not straight but has a curved configuration. More particularly, the longitudinal axis 21 of the light guide 11 may have an S-shape or a sinus-like shape. Due to such curvature to opposite sides, the light transmitted by the light guide 11 gets mixed and, thus, more homogeneous. At the same time, the light guide 11 may better follow the outer shape of the rounded outer housing 3*o* although it comes from the inner housing 3*i*.

Figure 6:
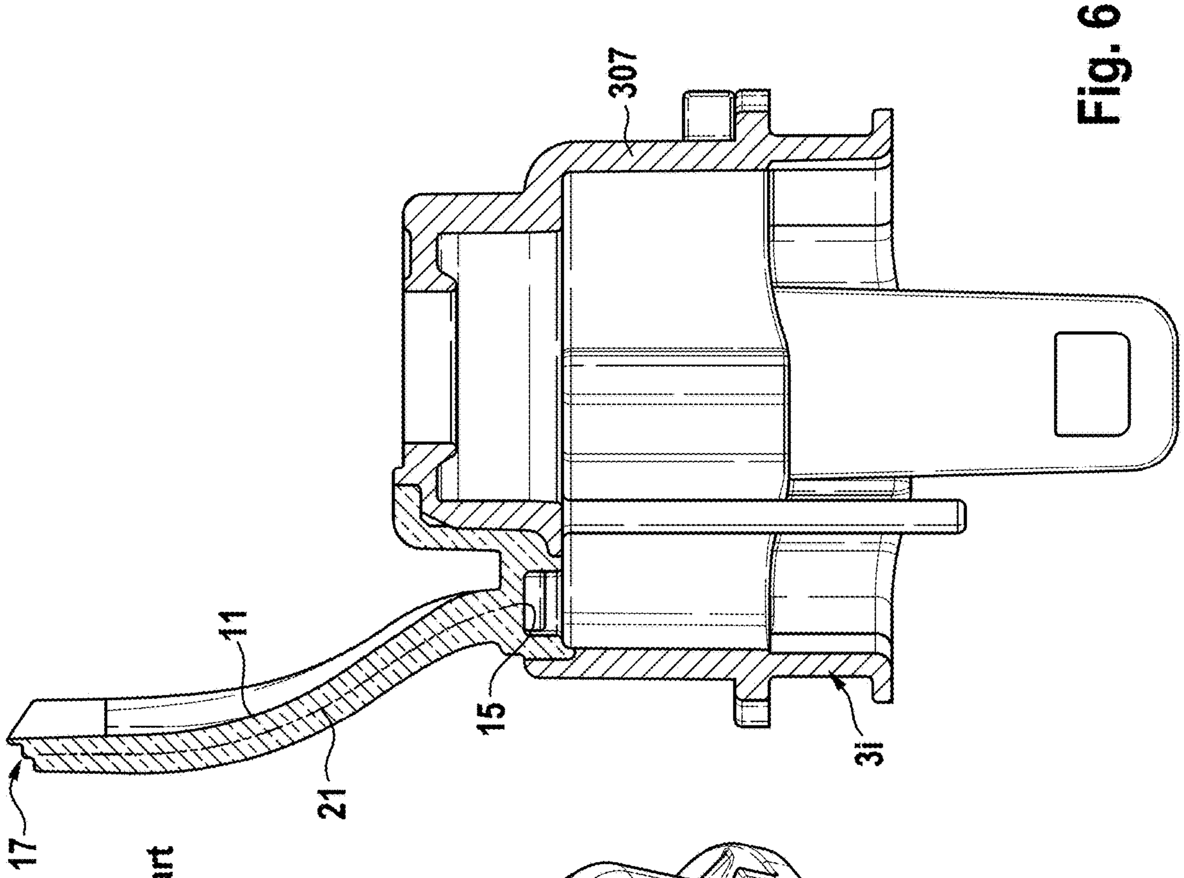
FIG. 6: a cross-sectional view of the interior housing cover element with the integrated light guide.
Figure 5:
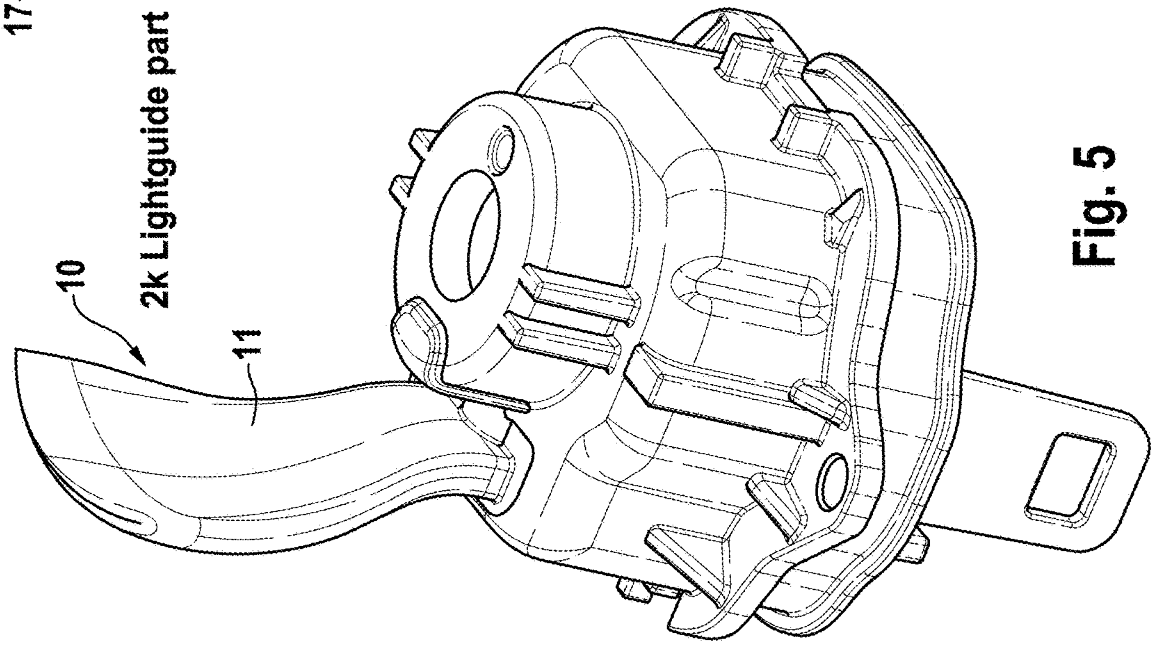
FIG. 5: a perspective view of the cover element of the interior housing of the hair trimmer of the preceding figures, showing the light emitting unit integrated into such cover element of the interior housing.

As can be seen from FIGS. 5, 6 and 8, the inlet end portion 14 and the outlet end portion 16 of the light guide are laterally offset relative to each other and furthermore, may be inclined relative to each other. Similarly, the light receiving surface 15 and the light emitting surface 17 may be laterally offset and/or inclined relative to each other.

Figure 4:
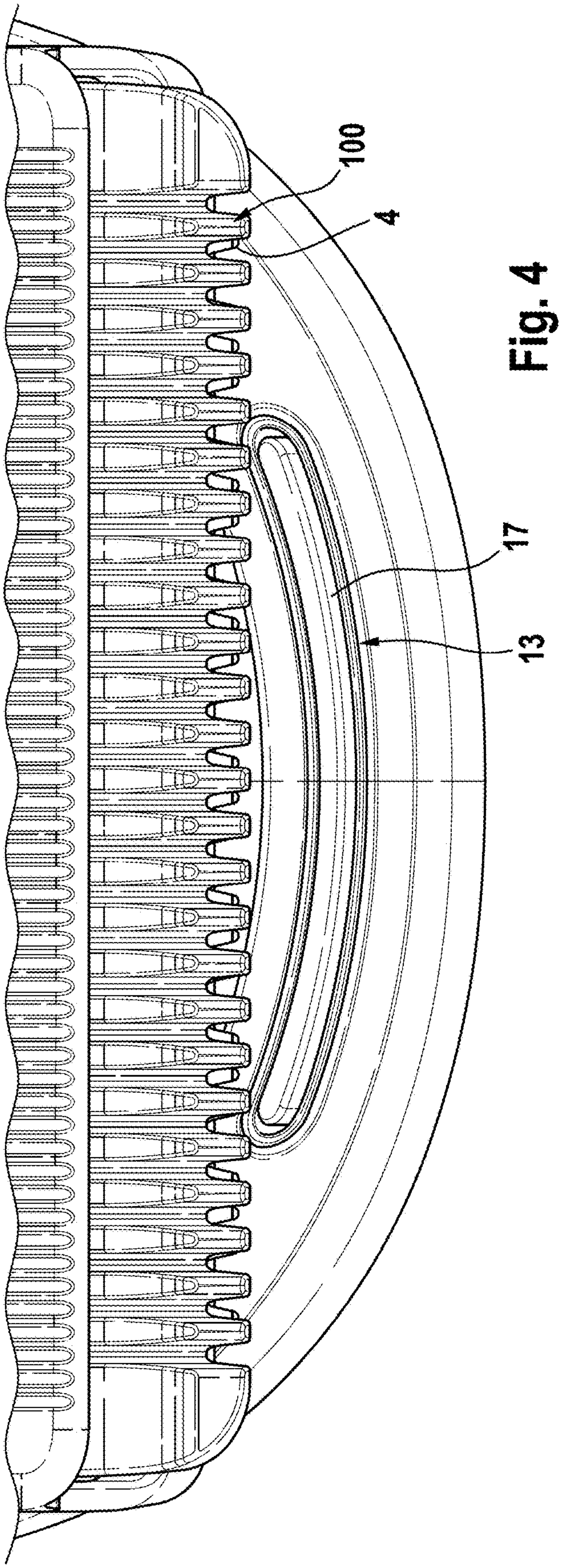
FIG. 4: a partial top view onto the working head showing the curved extension of the light emitting surface.

As can be seen from FIGS. 1, 3 and 4, the light guide 11 may end on an outer side of the outer housing 3*o* having a three-dimensional curvature. The outer housing 3*o*, at least at its portion close to the working head 3, may be rounded due to its substantially—roughly speaking—cylindrical shape and, at the same time, it may have curvature in a longitudinal cross-section, thus defining a three-dimensional curvature.

The light-emitting surface 17 basically follows such three-dimensional shape of the outer side of the outer housing 3*o* and, more particularly, it may be substantially flush with such outer surface.

Nevertheless, so as to avoid emitting light into wrong directions, the light-emitting surface 17 may have a cascaded or stepped contour, cf. FIG. 8 and FIG. 6 and also FIG. 3, wherein such cascaded contour may include elongated ribs or elongated facets extending along the elongated shape of the light-emitting surface 17.

As becomes clear from FIG. 8, the stepped surfaces, in particular the front surfaces of the stepped contour are directly facing the target area that should be illuminated and, thus, light emitted from such front faces of the stepped contour directly illuminate the target area surrounding the working unit 100.

Nevertheless, due to such cascaded or stepped contour, the light-emitting surface 17 may be substantially flush with the multi-axially curved outer surface of the housing 3. The outermost edges of the light-emitting surface 17 may be flush with the neighboring housing walls and the stepped surfaces therebetween may direct the light towards the target area.

Figure 2:
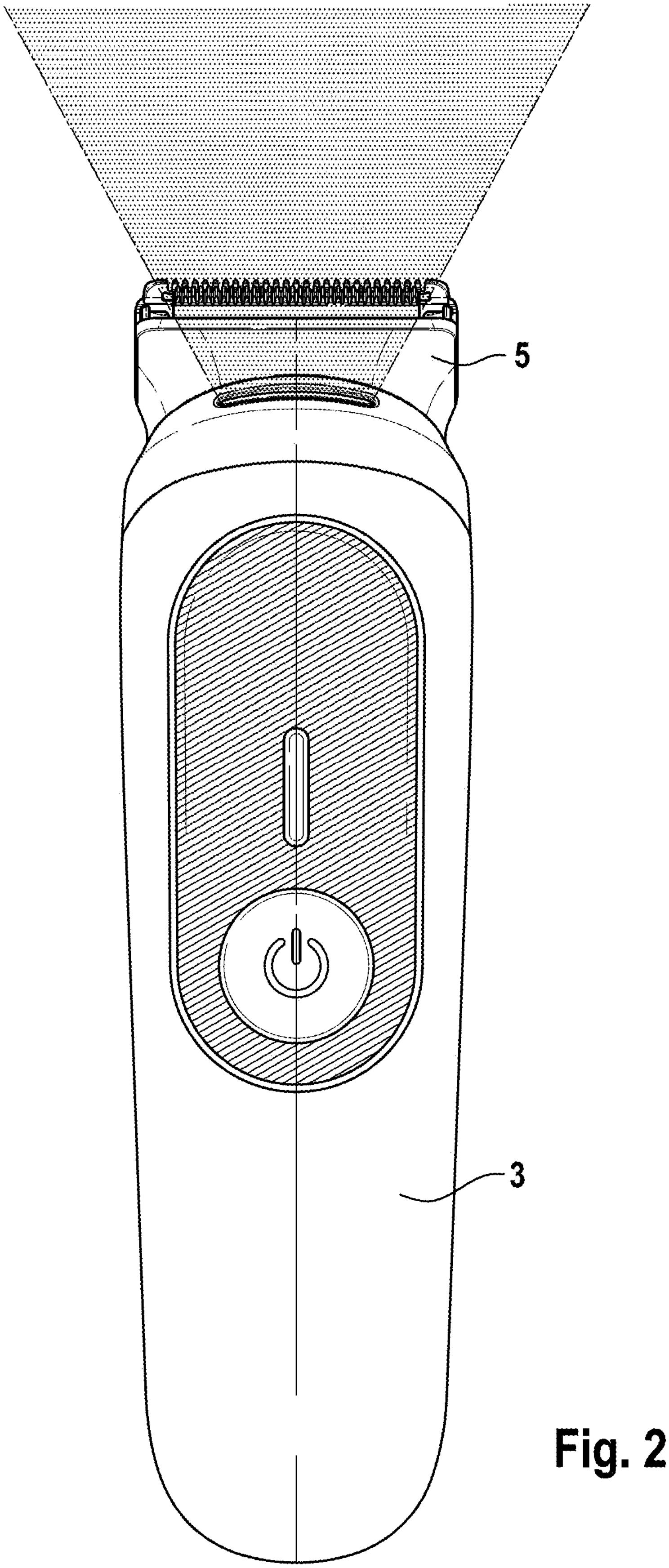
FIG. 2: a front view of the hair trimmer similar to FIG. 1, wherein the light cone emitted by the illumination unit towards the working area is shown.
Figure 11B:
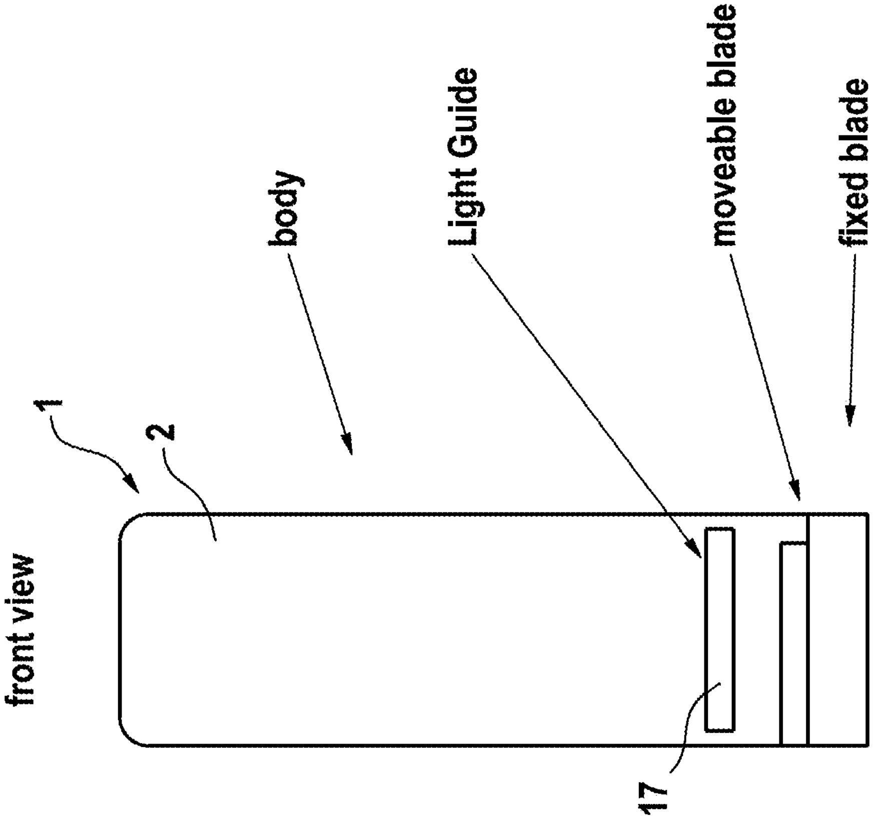
FIG. 11*b*: a schematic front view of the hair trimmer and the emitted light cone.
Figure 11A:
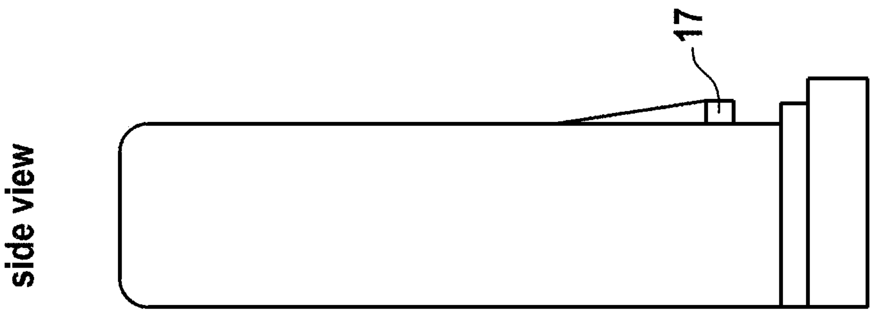
FIG. 11*a*: a schematic side view of the hair trimmer and the emitted light cone.
Figure 12:
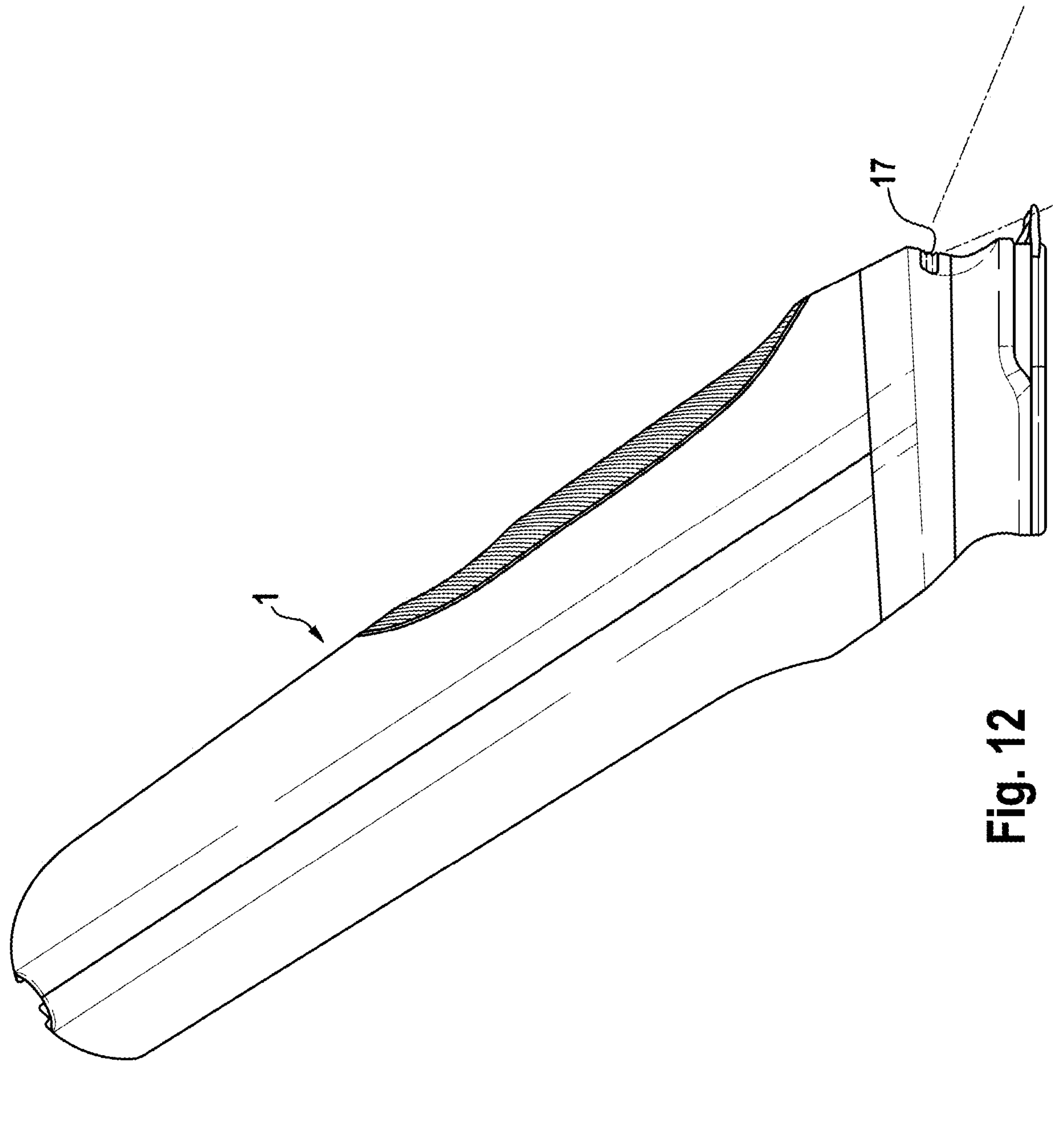
FIG. 12: a side view of the hair trimmer illustrating the emitted light cone to illuminate the trimmer tools and the surrounding area where hairs are to be trimmed.

FIGS. 11*a* and 11*b* illustrate schematically the overall arrangement of the light emitting surface of the light guide relative to the blades. Thus, the blades of the cutter unit 100 are well illuminated over its full teethed extension from the lower side thereof. FIG. 12 illustrates the light guide being arrange such that the light cone emitting onto the cutting unit and some portion of the users treating zone before that. See also FIG. 2 showing the light beam spreading at an angle that is sufficient to illuminate the cutting unit blades over its full width, so over all cutting teeth.

Figure 14:
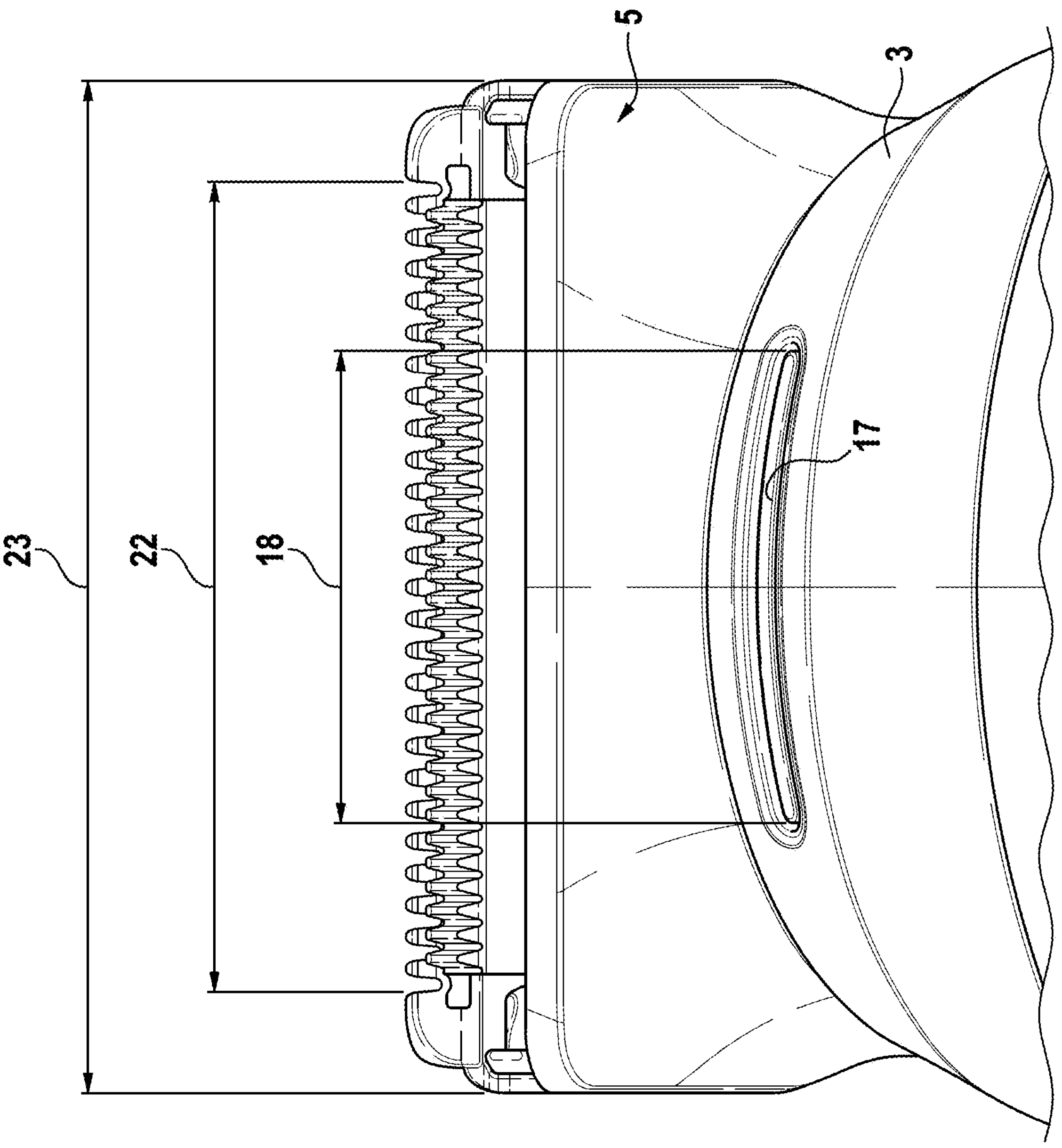
FIG. 14: a front view of the working head of the hair trimmer illustrating the length ratios between the light emitting surfaced of the illumination unit and the working tool unit of the working head.

As can be seen from FIG. 14, the length 18 of the light-emitting surface 17 may be more than 50% of the length 22 of the elongated cutter unit 100, i.e., the length of the extension of the cutting teeth on the cutting unit's blades.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed in:

1. A personal care device comprising an elongated housing receiving an electric motor and/or an electric power source, a working head attached to said housing, and an illumination unit for illuminating the working head and/or a surrounding working area, wherein the illumination unit comprises a light guide for guiding light from a light source to a light emitting surface, said light guide having a light receiving surface, wherein, said light receiving surface is laterally offset and/or inclined relative to said light emitting surface, and said housing includes an inner housing and an outer housing surrounding said inner housing such that an outer surface of the inner housing is adjacent to an inner surface of the outer housing, the inner housing forms a sealed container in which said motor and said light source are received, wherein said light guide extends through said inner housing and through said outer housing and is sealed against such inner housing wherein said light guide and said inner housing form an integral plastic molding piece.

2. Personal care device according to claim 1, wherein said light guide and said inner housing form a two-component molding piece, wherein the light guide is integrally joined to the inner housing, thereby sealing the light guide against said inner housing.

3. Personal care device according to claim 1, wherein said inner housing forming said sealed container has a barrel structure and is formed by an elongated cup element having a closed bottom and a cover element surrounding a motor shaft and/or a transmitter for transmitting motor action to the working head, said cover element closing said cup element, wherein said light guide extends through and is joined to said cover element.

4. Personal care device according to claim 3, wherein said elongated cup element has a length of at least about 80% of the entire length of the inner housing and/or wherein said inner housing is only provided with an opening for said motor shaft.

5. Personal care device according to claim 1, wherein said light guide has a solid matter body made from plastic, wherein an inlet end portion of said light guide is provided with a light source receiving recess in an interior of which at least part of said light source is accommodated.

6. Personal care device according to claim 1, wherein said light guide has an outlet end portion defining the light emitting surface having a length ranging from about 33% to about 120% of a working width of a working tool unit of said working head.

7. Personal care device according to claim 1, wherein the light emitting surface of the light guide is spaced apart from a working tool unit of the working head by a distance (H) that is smaller than a length of the light emitting surface of the light guide.

8. Personal care device according to claim 1, wherein said light guide has a cross-sectional area continuously increasing from an inlet end portion to an outlet end portion of said light guide, wherein the cross-sectional area at the outlet end portion is at least about 150% of the cross-sectional surface area at the inlet end portion.

9. Personal care device according to claim 1, wherein the light emitting surface of the light guide is positioned at an outer side of the housing at a portion thereof having intervisibility to the working tool unit of the working head.

10. Personal care device according to claim 1, wherein the light emitting surface of the light guide is substantially flush with an outer surface of the housing, said outer surface having a three-dimensional curvature.

11. Personal care device according to claim 1, wherein the light emitting surface of the light guide has a cascaded or stepped light emitting surface the outer most portions of which are substantially flush with an outer surface of the housing.

12. Personal care device according to claim 1, wherein the light guide is configured to have total internal reflection and extends, from the inner housing to the outer housing, spaced apart from other elements of the personal care device.

13. Personal care device according to claim 1, wherein the light guide has a main longitudinal axis having an S-shape or meandering shape or sinuous winding shape.

14. Personal care device according to claim 1, wherein the light emitting surface of the light guide is provided with a surface structure for scattered emission of the light.

15. Personal care device according to claim 1, wherein the personal care device is an electric hair trimmer.

16. Personal care device according to claim 1, wherein said inner housing is provided with a second opening for a charging connection on an end portion of said inner housing opposite to said first opening.

* * * * *